United States Patent
Polmans et al.

(10) Patent No.: US 10,822,022 B2
(45) Date of Patent: Nov. 3, 2020

(54) TRANSPORT KEY FOR A STEER-BY-WIRE STEERING SYSTEM FOR MOTOR VEHICLES

(71) Applicants: THYSSENKRUPP PRESTA AG, Eschen (LI); thyssenkrupp AG, Essen (DE)

(72) Inventors: Kristof Polmans, Tarrenz (AT); Philippe Steck, Eschen (LI)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 274 days.

(21) Appl. No.: 16/094,347

(22) PCT Filed: Apr. 12, 2017

(86) PCT No.: PCT/EP2017/058742
§ 371 (c)(1),
(2) Date: Oct. 17, 2018

(87) PCT Pub. No.: WO2017/182351
PCT Pub. Date: Oct. 26, 2017

(65) Prior Publication Data
US 2019/0152518 A1 May 23, 2019

(30) Foreign Application Priority Data
Apr. 19, 2016 (DE) .......................... 10 2016 004 593

(51) Int. Cl.
B62D 5/04 (2006.01)
B62D 5/00 (2006.01)
(Continued)

(52) U.S. Cl.
CPC ............ B62D 5/0484 (2013.01); B60R 25/02 (2013.01); B62D 1/28 (2013.01); B62D 5/003 (2013.01);
(Continued)

(58) Field of Classification Search
CPC ........ B62D 5/0484; B62D 1/28; B62D 5/003; B62D 5/0487; B62D 5/0489; B62D 5/0493; B60R 25/02
See application file for complete search history.

(56) References Cited

U.S. PATENT DOCUMENTS 9,434,431 B2 * 9/2016 Kim ........................ B62D 5/30
9,771,100 B2 * 9/2017 Sugai ................. B60G 17/0161
(Continued)

FOREIGN PATENT DOCUMENTS

CN 1741368 A 3/2006
CN 101758813 A 6/2010
(Continued)

OTHER PUBLICATIONS

English Translation of International Search Report issued in PCT/EP2017/058742, dated Jun. 20, 2017(dated Jun. 27, 2017).

*Primary Examiner* — Kevin Hurley
*Assistant Examiner* — Marlon A Arce
(74) *Attorney, Agent, or Firm* — thyssenkrupp North America, LLC

(57) ABSTRACT

A steer-by-wire steering system for motor vehicles may include a primary steering level with a steering transmission device, which is arranged to subject wheels of the motor vehicle to a desired setpoint steering effect, and a secondary steering level with a safety device that provides predefined functions, so that in the case of a malfunction of the primary steering level, steering the wheels remains possible during an emergency mode. The steer-by-wire steering system may
(Continued)

also include an authentication system with a communications interface for communications with the safety device. The authentication system may be arranged so that in the case of a successful authorization, the secondary steering level of the steer-by-wire steering system is also available after the emergency mode.

16 Claims, 1 Drawing Sheet

(51) Int. Cl.
  *B60R 25/02* (2013.01)
  *B62D 1/28* (2006.01)
(52) U.S. Cl.
  CPC ......... *B62D 5/0487* (2013.01); *B62D 5/0493* (2013.01)

(56) References Cited

U.S. PATENT DOCUMENTS

| | | | |
|---|---|---|---|
| 10,214,235 B2* | 2/2019 | Sasaki | B62D 5/049 |
| 2002/0092696 A1 | 7/2002 | Bohner | |
| 2006/0043917 A1 | 3/2006 | Kifuku | |
| 2013/0060424 A1 | 3/2013 | Bouwman | |
| 2014/0172236 A1* | 6/2014 | Nishikawa | B62D 6/00 701/42 |
| 2017/0294120 A1* | 10/2017 | Ootsuji | B62D 12/02 |

FOREIGN PATENT DOCUMENTS

| | | |
|---|---|---|
| DE | 10340369 A | 3/2005 |
| EP | 1138563 A | 10/2001 |
| EP | 2738067 A | 6/2014 |

* cited by examiner

TRANSPORT KEY FOR A STEER-BY-WIRE STEERING SYSTEM FOR MOTOR VEHICLES

CROSS REFERENCE TO RELATED APPLICATIONS

This application is a U.S. National Stage Entry of International Patent Application Serial Number PCT/EP2017/058742, filed Apr. 12, 2017, which claims priority to German Patent Application No. DE 10 2016 004 593.0, filed Apr. 19, 2016, the entire contents of both of which are incorporated herein by reference.

FIELD

The present disclosure generally relates to steering systems, including steer-by-wire steering systems for motor vehicles that provide predefined functions during emergencies.

BACKGROUND

The present invention concerns a steer-by-wire steering system for motor vehicles with the features of the preamble of claim 1.

Motor vehicles with conventional EPAS steering systems comprise a solid mechanical connection between the steering wheel and the steered wheels, so that even in the event of a failure of the power steering the mechanical feedthrough continues to exist. In steer-by-wire steering systems, a mechanical connection between the steering wheel and the steering gearbox is completely omitted. Instead of the mechanical coupling, a wheel angle adjuster is used for positioning the wheels and a manual actuator is used for simulating the restoring forces on the steering wheel.

With a steer-by-wire steering system of this type, in the case of failure of the power steering it is not possible for the driver to continue to steer the vehicle by means of a mechanical feedthrough and applying muscle power. In order to achieve comparable reliability with conventional steering systems, a steer-by-wire steering system must either be fail-safe or fault tolerant. A fail-safe steer-by-wire system contains a mechanical fallback level. The mechanical fallback level enables all electronically controlled functions to be switched off in the case of a safety-critical electrical or electronic fault and the steer-by-wire system to be changed into the mode of a conventional mechanical steering system.

By contrast, a fault tolerant steer-by-wire system is based on a distribution of the hardware that is necessary for maintaining the system functions. In this case, the hardware is distributed on a plurality of electronic and mechatronic sub systems that form local redundancies. If a sub system fails or is switched off as a result of the internal or external fault detection mechanism, the local redundancy thereof guarantees maintenance of the system function that is supported thereby.

A system of this type with an electrical fallback level is known from US 2013/0060424 A1 for example.

In the event of a fault of the steer-by-wire system, the motor vehicle can continue to be steered using the electrical fallback level and can be safely brought to a standstill at the side of the road. An emergency mode is provided thereby, which enables "limp aside", i.e. steering/moving/driving the vehicle into a safe parking position, or may also enable "limp home", i.e. steering/moving/driving the vehicle over a longer distance, for example into a workshop. In order to prevent further use of the now no longer fail-safe steering system by the driver, the motor vehicle is switched off. The vehicle must be recovered, for example by loading on a trailer and transferring to a workshop, where it remains incapable of being maneuvered until it is repaired.

Thus a need exists for a fault tolerant steer-by-wire steering system for motor vehicles, with which maneuvering the motor vehicle remains possible in the event of a fault.

DETAILED DESCRIPTION

Figure 1:
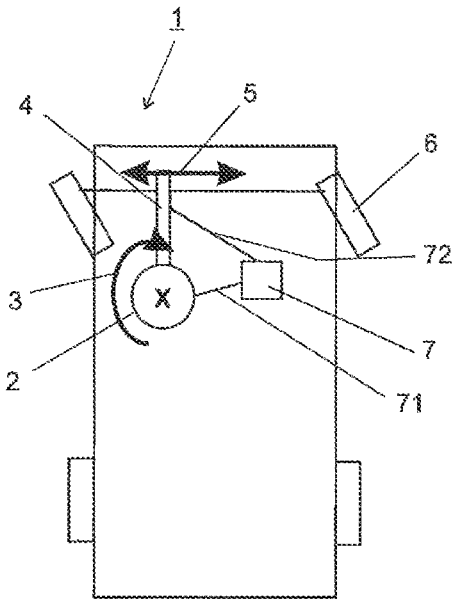
FIG. 1 is a schematic view of an example fault tolerant steer-by-wire steering system in an operating state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steer-by-wire steering system for motor vehicles may comprise a primary steering level with a steering transmission device, which is arranged to subject the wheels to be steered of the motor vehicle to a desired setpoint steering effect, and a secondary steering level with a safety device that provides predefined functions, so that in a case of a malfunction of the primary steering level, steering the wheels remains possible during an emergency mode, wherein the steer-by-wire steering system comprises an authentication system with a communications interface for communications with the safety device, wherein the authentication system is arranged so that in the case of successful authorization of the secondary steering level, the steer-by-wire steering system is also available after the emergency mode. Said fault tolerant steer-by-wire steering system enables maneuvering of the motor vehicle to remain possible even in the event of a fault.

The authentication system preferably comprises a terminal for authentication. In this case, it is advantageous if the terminal is external and can be connected to the communications interface.

The authentication system is preferably designed such that an authentication method is carried out, in which a key or code is checked.

In one embodiment, the authentication system is designed such that an authentication method is carried out, in which a key or code that is input via the terminal is checked.

The authentication system can also be designed such that the authentication method is combined with a location query.

In this case, it is preferable that specified locations for the location query are approved in advance. However, it can also be provided that specified geographic regions for the location query are approved in advance.

The location query is preferably GPS-based.

The secondary steering level is preferably embodied in an electrical or electronic form. Furthermore, the communications interface is advantageously unidirectional.

Furthermore, a terminal is provided for authentication for a previously described steer-by-wire steering system that takes into account the special requirements.

In FIG. 1, a motor vehicle 1 with a steer-by-wire steering device is represented, in which the driver controls the motor vehicle with a steering wheel 2 or the vehicle is controlled by means of an automatic program. During steering, the steering movement 3 is transmitted via a steering transmission device 4 to a mechanical actuation system 5, which subjects the wheels 6 to the desired setpoint steering effect via track rods. A safety device 7 with measurement lines and control lines 71, 72 forms the fallback level and enables fault redundancy.

Figure 2:
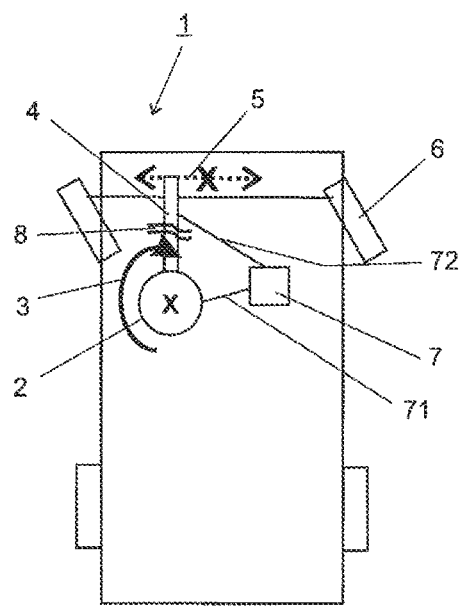
FIG. 2 is a schematic view of the example steer-by-wire steering system of FIG. 1 in a faulty state.
Figure 3:
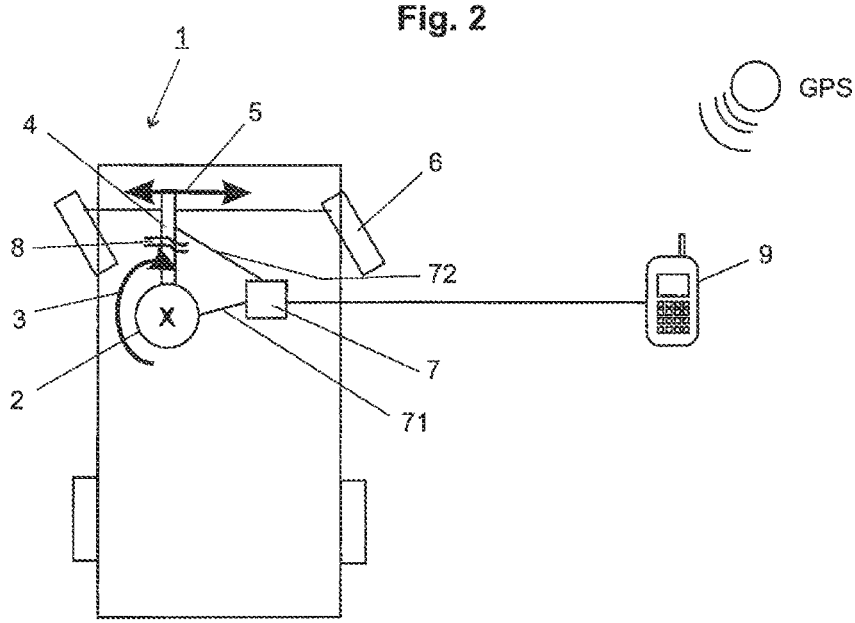
FIG. 3 is a schematic view of the example steer-by-wire steering system of FIG. 1 in which maneuverability is restored in the faulty state with a special key.

In the case of a fault or a disruption 8 in the steering system, as shown in FIG. 2, the safety device 7 can provide certain functions, using which the vehicle can still be driven to the side of the road and stopped. However, it is conceivable and possible that even such functions can no longer be permitted for safety reasons or can no longer be displayed for technical reasons. Accordingly, the connection to the mechanical actuation system 5 is interrupted and the vehicle can no longer be maneuvered.

So that the vehicle remains maneuverable, an authentication system 9 is provided, using which safety functions can be bypassed and thus a mechanical coupling that was provided as a fallback level can be replaced by a direct electrical intervention, for example. The authentication system 9 comprises a communications interface to the steer-by-wire steering system of the motor vehicle and a terminal for authentication, for example a multifunction display or similar, which enables the input of a workshop key or a code. By means of the communications interface, the workshop key or the code can be transferred to the safety device 7 and can be analyzed there. In a different embodiment, the authentication system 9 can be used as a control unit for direct input of the steering movement that is transmitted to the mechanical actuation system 5. The authentication system 9 ensures that the steer-by-wire steering system is exclusively accessible only to a certain group of people. In a different embodiment, the workshop key or code is already stored in the terminal. Furthermore, it is conceivable that instead of a workshop key or code a different known authentication method can be used, such as biometric fingerprint systems for example.

To increase safety, a location query, for example by means of GPS location, can be additionally provided in the authentication system 9 or in the safety device 7. Locations can thus be pre-approved for the authentication system 9. It can thereby be provided that the approval can be carried out for a known geographic region in order to prevent misuse or theft. It is also conceivable to approve locations on request.

The steer-by-wire steering system can thus be reactivated by an authorized person skilled in the art. The still functional fallback level is thereupon set in a mode that enables driving the vehicle. For safety reasons, said transition state can be restricted to low vehicle speeds. In said mode, the vehicle can for example be carried on a tow truck by a recovery specialist or can be maneuvered by a mechanic in the workshop.

In the situation described above of a vehicle that is steered by means of steer-by-wire without a primary steering level, the fallback level, using which the vehicle was brought to a safe standstill, is still available. The present invention provides a technical solution as to how such a vehicle continues to remain maneuverable for authorized persons. This represents a significant simplification of the handling of a motor vehicle with a steer-by-wire steering system when towing, but also in the workshop.

What is claimed is:

1. A steer-by-wire steering system for a motor vehicle comprising:
    a primary steering level with a steering transmission device, which is arranged to subject wheels to be steered of the motor vehicle with a desired setpoint steering effect;
    a secondary steering level with a safety device that provides predefined functions so that if the primary steering level malfunctions, steering the wheels remains possible in an emergency mode until the motor vehicle is turned off; and
    an authentication system with a communications interface for communications with the safety device, wherein the authentication system is arranged such that after a successful authorization the secondary steering level is available also after the motor vehicle is turned off following the emergency mode.

2. The steer-by-wire steering system of claim 1 wherein the authentication system comprises a terminal for authentication.

3. The steer-by-wire steering system of claim 2 wherein the terminal is external and is connectable to the communications interface.

4. The steer-by-wire steering system of claim 2 wherein the authentication system is configured to check a key or a code that is input by way of the terminal.

5. The steer-by-wire steering system of claim 1 wherein the authentication system is configured to check a key or a code.

6. A steer-by-wire steering system for a motor vehicle comprising:
    a primary steering level with a steering transmission device, which is arranged to subject wheels to be steered of the motor vehicle with a desired setpoint steering effect;
    a secondary steering level with a safety device that provides predefined functions so that if the primary steering level malfunctions, steering the wheels remains possible in an emergency mode; and
    an authentication system with a communications interface for communications with the safety device, wherein the authentication system is arranged such that after a successful authorization the secondary steering level is available following the emergency mode, wherein an authentication method performed by the authentication system is combined with a location query.

7. The steer-by-wire steering system of claim 6 wherein the authentication system is configured so that specified locations for the location query are pre-approved.

8. The steer-by-wire steering system of claim 6 wherein the authentication system is configured so that specified geographic locations for the location query are pre-approved.

9. The steer-by-wire steering system of claim 6 wherein the authentication system is configured so that the location query is GPS-based.

10. The steer-by-wire steering system of claim 6 wherein the secondary steering level has an electrical form or an electronic form.

11. The steer-by-wire steering system of claim 6 wherein the communications interface is configured to be unidirectional.

12. The steer-by-wire steering system of claim 6 wherein the authentication system comprises a terminal for authentication.

13. The steer-by-wire steering system of claim 12 wherein the terminal is external and is connectable to the communications interface.

14. The steer-by-wire steering system of claim 12 wherein the authentication system is configured to check a key or a code that is input by way of the terminal.

15. The steer-by-wire steering system of claim 6 wherein the authentication system is configured to check a key or a code.

16. A terminal for authentication of the steer-by-wire steering system of claim 6.

\* \* \* \* \*